US008366084B2

(12) United States Patent
Halladay

(10) Patent No.: US 8,366,084 B2
(45) Date of Patent: Feb. 5, 2013

(54) WORK TABLE

(76) Inventor: Robert B. Halladay, Red Bluff, CA (US)

( * ) Notice: Subject to any disclaimer, the term of this patent is extended or adjusted under 35 U.S.C. 154(b) by 405 days.

(21) Appl. No.: 12/824,064

(22) Filed: Jun. 25, 2010

(65) Prior Publication Data

US 2011/0316211 A1 Dec. 29, 2011

(51) Int. Cl.
*B23Q 3/00* (2006.01)

(52) U.S. Cl. ........... 269/17; 269/55; 269/71; 269/289 R; 248/188.6; 108/64

(58) Field of Classification Search .................... 269/17, 269/60, 55, 71, 75, 136, 138, 289 R; 248/129, 248/188.6, 166; 108/3, 6, 7, 66, 64, 59
See application file for complete search history.

(56) References Cited

U.S. PATENT DOCUMENTS

| | | | | |
|---|---|---|---|---|
| 1,349,633 | A * | 8/1920 | Staley | 269/17 |
| 1,603,307 | A * | 10/1926 | Anderson | 269/61 |
| 2,619,135 | A | 11/1952 | Callaway | |
| 2,662,566 | A | 12/1953 | Kurschner | |
| 2,835,289 | A | 5/1958 | Rockwell | |
| 3,923,167 | A * | 12/1975 | Blankenbeckler | 414/11 |
| 4,318,432 | A | 3/1982 | Howey | |
| 4,497,353 | A | 2/1985 | Sproat, Jr. | |
| 4,549,366 | A * | 10/1985 | Gerding et al. | 38/102.2 |
| 4,890,654 | A | 1/1990 | Fox | |
| 5,431,206 | A | 7/1995 | McAllister | |
| 5,518,053 | A | 5/1996 | Robison | |
| 5,603,491 | A * | 2/1997 | Murrell | 269/15 |
| 5,863,052 | A | 1/1999 | Roman | |
| 5,865,228 | A | 2/1999 | Patterson | |
| 6,148,881 | A | 11/2000 | Valenzuela | |
| 6,237,659 | B1 | 5/2001 | Francis | |
| 6,484,378 | B1 * | 11/2002 | Arvin | 29/281.5 |
| D550,476 | S | 9/2007 | Liu et al. | |
| 7,448,606 | B1 * | 11/2008 | Johnson | 269/17 |
| 7,520,228 | B2 * | 4/2009 | Mangano et al. | 108/115 |
| 8,231,119 | B2 * | 7/2012 | Marshall et al. | 269/266 |
| 2002/0179181 | A1 | 12/2002 | Murphy | |
| 2005/0061399 | A1 | 3/2005 | Rulli | |
| 2008/0083106 | A1 | 4/2008 | Elsworthy | |
| 2009/0079310 | A1 | 3/2009 | Sparrow | |
| 2009/0241805 | A1 * | 10/2009 | Hernandez | 108/6 |

FOREIGN PATENT DOCUMENTS

| | | |
|---|---|---|
| EP | 0609573 A1 | 9/2010 |
| GB | 686994 | 2/1953 |
| GB | 1551203 | 8/1979 |

* cited by examiner

*Primary Examiner* — Joshua J Michener
*Assistant Examiner* — Matthew Gitlin
(74) *Attorney, Agent, or Firm* — Nixon Peabody LLP

(57) ABSTRACT

A table which supports work pieces includes a base with a first part and a second part hinged together so that the second part may be swung up and away from the standing surface for storage and be swung down to engage the standing surface. A support column is secured to the base and coupled to a brace member which is foldable between a first state when the second part is in contact with the standing surface and a second state when the second part is not in contact with the standing surface. The table includes a work platform that is coupled to the central support column and rotatable between a horizontal orientation parallel to the standing surface and a non-horizontal orientation. The work platform is configured to have work stations which receive and mount work pieces so that the work pieces are secured to the work platform in both the horizontal and non-horizontal orientations.

20 Claims, 2 Drawing Sheets

WORK TABLE

TECHNICAL FIELD

The present disclosure relates generally to a work table.

BACKGROUND

Work tables which hold heavy equipment, such as power tools and the like, are very popular. For work tables to be able to support one or more pieces of heavy equipment, they must large, sturdy and made of strong materials. Many types of heavy equipment are required to be mounted or secured to the table during use. These constraints usually result in the work table being large, bulky and difficult to move from one location to another. This may be an issue at non-secure construction sites where equipment (with or without the table) must be put away after use to prevent theft. In addition, there may not be adequate space at the site to store the equipment and/or table after use.

What is needed is a sturdy work table which secures work pieces thereon, whereby the table is easily moveable and can be converted to a smaller size which makes it easy to store.

OVERVIEW

In an aspect, the present disclosure is directed to a table which supports machine tools and work pieces. The table comprises a base which has a first part with a plurality of casters configured to engage a standing surface. The table includes a second part with at least one caster configured to engage the standing surface, wherein the first part and the second part are hinged together. The second part may be swung up and away from the standing surface for storage. In contrast, the second part may be swung down toward the standing surface so that its at least one caster engages the standing surface. The table includes a central support column that is secured to the base. The table includes at least one brace member in engagement with both the second part of the base and the central support column. The brace member is configured so that when the brace member is in a first state, the caster of the second part of the base is engaged with the standing surface. The brace member is configured so that, when brace member is in a second state, the caster of the second part of the base is not engaged with the standing surface. The table includes a work platform that is hingedly coupled to the central support column. This allows the work platform to be configured in a first horizontal orientation that is generally parallel to the standing surface, during normal use. The work platform may be rotated to a second, non-horizontal orientation which is not parallel to the standing surface, during storage. The work platform is configured to have a plurality of work stations at its periphery, whereby each of the work stations is configured to receive a power tool which is securely mounted thereto so that the power tools are secured to the work platform in both the first orientation and the second orientation.

In an aspect, the present disclosure is directed to a table that supports machine tools and work pieces. The table comprises a base that is configured to be in contact with a standing surface. The base includes a first part and a second part which are hinged together, wherein the second part is rotatably moveable about the hinge between a first operational position and a first stowed position. The table includes a support column secured to the base and at least one brace member coupled to the second part of the base and the support column. The brace member is configured to move between a first state, when the second part of the base is in the first operational position, and a second state, when the second part of the base is in the first stowed position. The table includes a work platform hingedly coupled to the support column. The work platform is rotatable about a hinge between a second operational position and a second stowed position. The work platform is horizontal and generally parallel to the standing surface when in it is in the second operational position. The work platform is non-horizontal and not parallel to the standing surface when it is in the second stowed position. The work platform has a plurality of work stations, wherein each of the work stations is configured to securely mount a work piece so that the work piece is secured to the work platform in both the second operational position and the second stowed position.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a foldable work table for supporting work pieces. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 3:
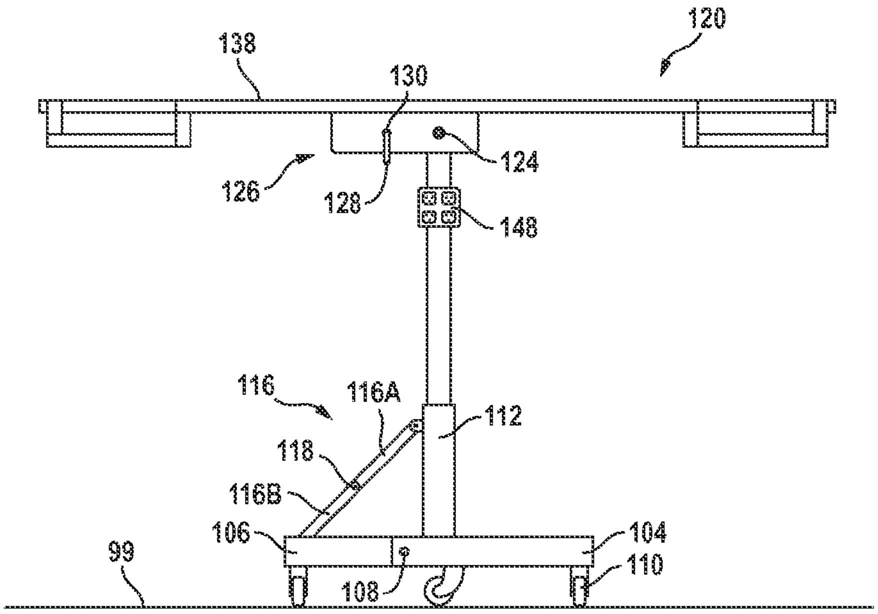
FIG. 3 illustrates a side view of the table in an operational position in accordance with an aspect of the present disclosure.
Figure 4:
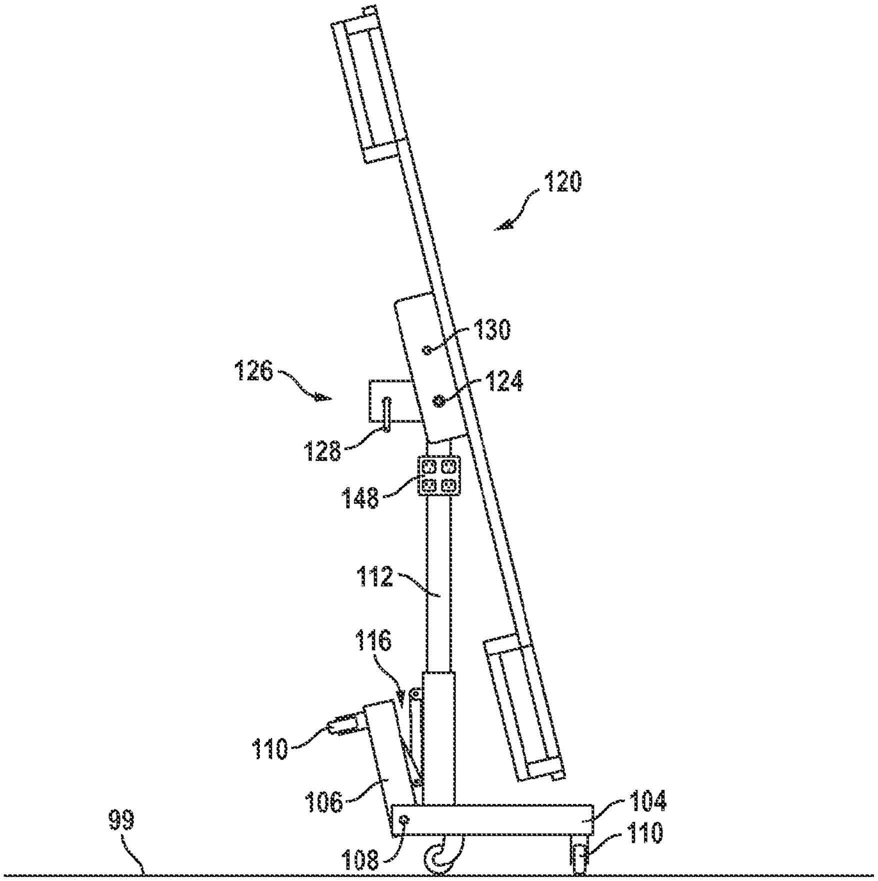
FIG. 4 illustrates a side view of the table in a stowed position in accordance with an aspect of the present disclosure.

The present disclosure generally relates to a work table 100 for supporting work pieces 98 in which the table 100 includes a base 102 that has a first part 104 and a second part 106 hinged together so that the second part 106 may be swung up and away from the standing surface 99 (FIGS. 3 and 4) for storage and be swung down to engage the standing surface 99 during use. A vertically extending support column 112 is secured to the base 102 and is coupled to a brace member 116 which is foldable between a first state, where the second part 106 of the base 102 is in contact with a standing surface 99 (also referred to as "surface"), and a second state, where the second part 106 of the base 102 is not in contact with the standing surface 99 (FIG. 4). The table 100 includes a work platform 120 that is rotatably coupled to the support column 112 and moveable between an operational position, in which the work platform 120 is horizontal and generally parallel to the standing surface 99 (FIG. 3), and a stowed position in which the work platform 120 is not horizontal to the standing surface 99 (FIG. 4). The work platform 120 includes work stations 122 (including or not including work mounts 146, 149, 150) which receive and secure work pieces 98 to the work platform 120 regardless of whether the table 100 is in the operational or stowed positions. More detail of the table 100 are presented below.

Figure 1:
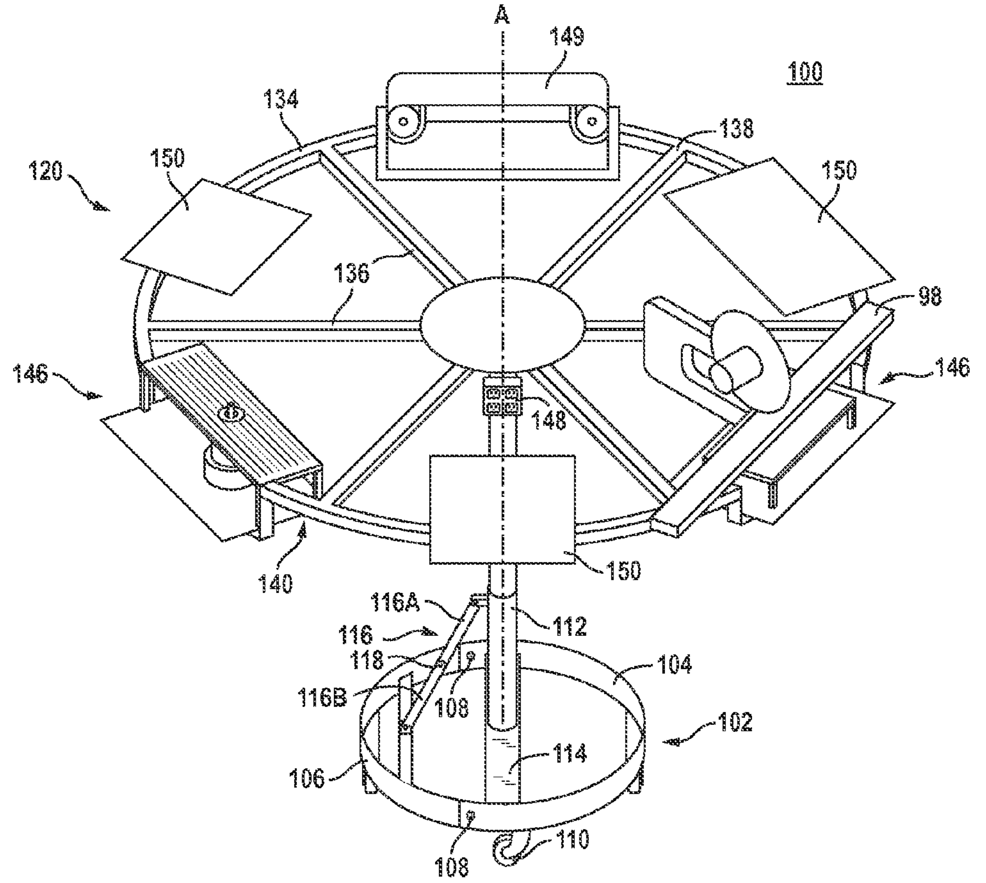
FIG. 1 illustrates a perspective view of a table in accordance with an aspect of the present disclosure.

FIG. 1 illustrates a perspective view of a table 100 in accordance with an aspect of the present disclosure. In particular, the table 100 includes a base 102, one or more support columns 112 coupled to the base and a work platform 120 coupled to the support column 112. In an aspect, the base 102, the work platform 120 and the support column 112 are made of steel, iron or any other appropriate metal to accommodate and support heavy work pieces 98. However, other materials such as polymers, plastics and composites are contemplated.

The base 102 comprises a first part 104 and a second part 106 in which the first and second parts 104, 106 are coupled to one another with base hinges 108. As shown in FIG. 1, a plurality of casters 110 are coupled to the first and second parts 104, 106 of the base 102, whereby the casters 110 are in contact with the surface 99, such as a standing surface or ground, and allow the table 100 to be moved along the surface 99 from one location to another. It is contemplated, in another aspect, that the table 100 does not include casters 110, whereby the first and second parts 104, 106 are in direct contact with the surface 99. It is also contemplated that other moving means may be implemented on the base 102 to allow the table 100 to be moved along the surface 99. The base 102 shown in FIG. 1 has an overall circular shape; however it is contemplated that the shape of the base 102 is not limited to being circular and may have any other appropriate polygonal or non-polygonal shapes.

The second part 106 of the base 102 is foldable with respect to the first part 104 to move between an operational position (FIG. 3) and a stowed position (FIG. 4). In particular, the second part 106 (or caster 110) is in contact and engaged with the surface 99 when in the second part 106 is in the operational position, as shown in FIG. 3. The second part 106 of the base 102 (or caster 110) is configured to be rotated about base hinges 108 such that the second part 106 swings up and away from the surface 99 toward the support column 112. It should be noted that the second part 106 of the base 102 (or caster 110) is not in contact nor engaged with the surface 99 when in the stowed position, as shown in FIG. 4. As shown in FIG. 4, positioning of the second part 106 of the base 102 into the stowed position decreases the overall surface area which the table 100 occupies when it is stored.

In the example shown in FIGS. 1, 3 and 4, the first part 104 of the base 102 covers a larger surface area than the second part 106 to adequately support the weight of the work platform 120 and the mounted work pieces 98 when the table 100 is folded in the stowed position. In particular to the example circular base 102 in FIGS. 1, 3 and 4, first and second parts 104, 106 of the base 102 are arcs, whereby the first part 104 has a larger arc length than that of the second part 106.

The table 100 includes one or more central support columns 112 generally oriented in a vertical direction, wherein the support column 112 has a top end and a bottom end. Although the table 100 shown in FIG. 1 includes a single support column 112 oriented along vertical axis A, it is contemplated that a plurality of support columns can be used. The bottom end of the support column 112 is mounted to a horizontally oriented base beam 114, wherein the ends of the base beam 114 are mounted to the first part 104 of the base 102. The base beam 114 shown in FIG. 1 is one example of how the support column 112 is mounted to the base 102, and it should be noted that the support column 112 may be mounted to the base 102 in any other appropriate manner. The top end of the support column 112 is hingedly coupled to the work platform 120, as will be discussed below. In an aspect, the support column 112 has a telescoping feature which allows the support column 112 and thus, the work platform 120, to be adjustable in height by vertically moving it along axis A.

In an aspect, the brace member 116 includes two or more brace components 116A, 116B that are hingedly coupled to one another at their proximal ends via a brace hinge 118. Additionally, the opposing distal ends of the brace components 116A, 116B are hingedly coupled to the second part 106 of the base 102 and the support column 112. In the operational position (FIG. 3), the brace member 116 is extended and the brace components 116A, 116B are aligned and locked in a straight line. The brace member 116 thereby supports the base 102 and holds the entire table 100 upright when extended. In the stowed position, as shown in FIG. 4, the brace components 116A, 116B rotate about the brace hinge 118 such that the brace is in a folded position (FIG. 4). In an aspect, a locking feature is coupled to the brace member 116 and/or other components of the base 102 to ensure that the brace member 116 remains extended and/or folded.

The table 100 also includes a work platform 120, generally designated as 120, which is coupled to the top end of the support column 112. In general, the work platform 120 includes one or more work stations 122 which receive and mount or secure work pieces 98 thereon. Therefore, once a work piece 98 is mounted or secured to the work station 122, it cannot be removed from the work station 122 (regardless of whether the work platform 120 is in the operational or stowed position) until the user manually releases and removes the work piece 98 from the work station 122.

The work platform 120 is coupled to the support column 112 via a platform hinge 124 (FIGS. 3 and 4), whereby the platform hinge 124 is generally oriented horizontally. As shown in FIGS. 3 and 4, the work platform 120 can be rotated about the platform hinge 124 between an operational position and a stowed position. In particular, as shown in FIG. 3, the work platform 120, when in the operational position, is horizontally oriented and generally parallel to the surface 99. When the table 100 is in the stowed position, as shown in FIG. 4, the work platform 120 is no longer horizontal with the surface 99. In particular, the work platform 120 is rotated toward the first part 104 of the base 102, whereby the larger surface area covered the first part 104 provides the base 102 with adequate support to hold the table 100 upright and ensures that the table 100 (with or without the work pieces 98 mounted thereon) will not tip over.

In aspect, the table 100 includes a lock 126 which keeps the work platform 120 stationary with respect to the platform hinge 124 and prevents it from unintentionally being rotated about the platform hinge 124 when in the operational position. For the example shown in FIGS. 3 and 4, the lock 126 may comprise a pin 128 and slot 130 configuration in which a pin 128 can be fit within two or more aligned slots 130 located in a bottom portion of the work platform 120. However, it is contemplated that other types of locks can be used. In an aspect, a lock, such as the above mentioned lock or another type of lock can be implemented to ensure that the work platform 120 remains in the stowed position. Is contemplated that the work platform 120 can be locked at one or more intermediate positions between the operational position and the stowed position.

Figure 2A:
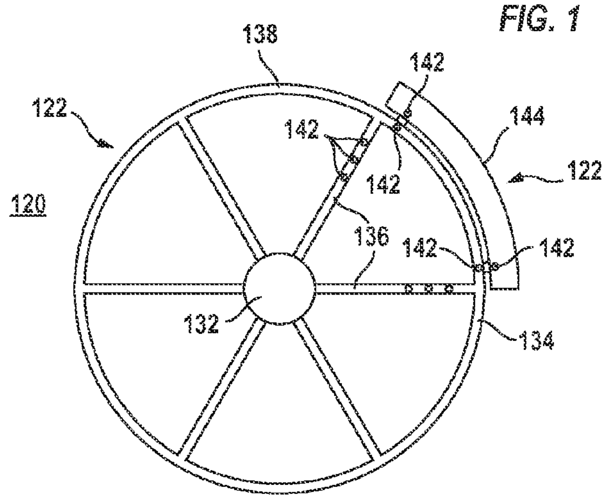
FIG. 2A illustrates a top view of a work platform in accordance with an aspect of the present disclosure.
Figure 2B:
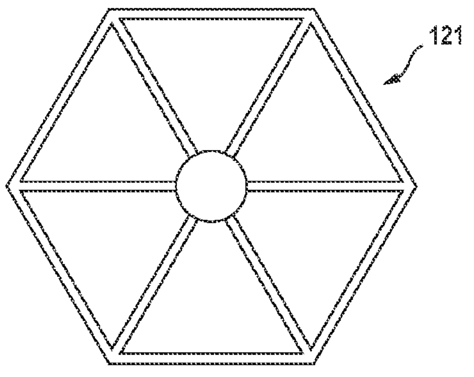
FIG. 2B illustrates a top view of another work platform in accordance with an aspect of the present disclosure.

The work platform 120 shown in FIGS. 1 and 2A includes a center portion 132 located at axis A and a circular outer portion 134 concentric with the center portion 132. However, the shape of the outer portion 134 need not be non-polygonal, as in FIG. 2, and can instead be polygonal (e.g. square, rectangular). For example, the outer portion 121 can have a hexagonal shape, as shown in FIG. 2B. In an aspect, the work platform 120 is rotatable about center axis A, whereby the work platform 120 can be manually rotated by the user to access other work pieces 98 without the user having to move around the work platform 120. It is contemplated that the work platform 120 may alternatively be electronically operated by a motor, whereby the user can press a button or switch to activate/terminate rotation of the work platform 120 about axis A.

As shown in FIG. 1, the work platform 120 comprises one or more horizontal brackets 136 which extend between the center portion 132 to the outer portion 134. The brackets 136 provide the needed support to hold the work pieces 98 which are mounted on the work stations 122. As shown in FIG. 1, the brackets 136 are individually spaced from one another such that no surface is present between adjacent brackets 136. However, it is contemplated that the table 100 can be configured such that a surface exists between two or more adjacent brackets 136 which functions as an additional work space for laying documents, schematics and the like. The brackets 136 shown in FIG. 1 are beam-like and have a polygonal cross section. However, it is contemplated that the brackets 136 may have a non-polygonal cross section (e.g. circular, oval) cross section.

The work platform 120 generally has a top surface 138 and a bottom surface 140, whereby the work pieces 98 are generally in contact with the top surface 138 when secured to the table 100. It is possible that the work pieces 98 may additionally or alternatively be in contact with the bottom surface 140 of the work platform 120. The work stations 122 are predetermined areas of the work platform 120 which receive and secure or mount the work piece 98 to the table 100. The work station 122 comprises holes, slides, vices or any other fastening means which secure the work piece 98 to the work platform 120. The work stations 122 may include additional components (e.g. flat surface 150) which are required to properly secure the work piece 98 to the work platform 120. In contrast, the work station 122 may be the area of the work platform 120 itself where the work piece 98 is directly mounted.

In an aspect, the work pieces 98 are heavy, powered or non-powered tools which require a sturdy platform upon which they are placed such that the tool or the platform 120 does not move during use. For example, work pieces 98 may be include, but are not limited to, table saws, milling equipment, lathes, spot welding equipment and the like. However, it is contemplated that the work pieces 98 may be other items like screen printing equipment, computers, printers, art equipment, and the like.

In an aspect, the outer portion 134, the brackets 136, and/or center portion 132 of the work platform 120 may include or incorporate a variety of known securing features which allow different types of work stations 122 to be secured and removed from the work platform 120. In the example shown in FIG. 2A, the work station 122 comprises the outer portion 134 and two of the brackets 136 having one or more securing holes 142 vertically extending through the outer portion 134 and the brackets 136, whereby the securing holes 142 receive bolts that secure the work station 122 and/or work piece 98 directly to the platform 120. It is contemplated that the work platform 120 may incorporate multiple securing holes 142 or other fastening means to allow a variety of different sized work stations 122 and/or work pieces 98 to be secured to the work platform 120. In an aspect, as shown in the example in FIG. 2A, a laterally extending extension 144 can be horizontally attached to the outer portion 134 thereby effectively extending the surface area of the work platform at the work station 122. The extension 144 may be used to accommodate a work piece 98 which needs to sit on a surface area larger that what is provided by the work station 122. The extension 144 may secured to the work platform 120 by bolts or other fastening means. In the situation that the work station includes is an additional component (as opposed to the work piece 98 being directly attached to the work platform 120), the work station 122 can be permanently mounted to the work platform 120 or be removable from the work platform 120.

As shown in FIG. 1, one or more work specialized stations 146 can be vertically recessed with respect to the work platform's 120 top surface 138. The recessed work stations 146 houses the work piece 98, wherein a working surface of the work piece 98 is at the same vertical level as the top surface 138 of the work platform 120. This allows the user to operate a work piece 98 which requires a level surface upon which to operate. For example, the recessed work stations 146 in FIG. 1 are shown housing a mill and a table saw. In an aspect, the recessed work station 146 can be vertically adjusted with respect to the remaining portion of the work platform 120 to allow work pieces 98 of different heights to be used with the table 100.

In an aspect, the table 100 includes one or more common power outlets 148 attached locally on the table 100 whereby plugs of one or more powered work pieces 98 can be simply connected to the table 100. The common power outlet 148 allows the powered work pieces 98 to remain plugged when the work platform 120 is rotated about axis A and/or rotated between the operational and stowed positions. Of course, the table 100 itself includes one or more corresponding primary power cords (not shown) which provide power to the one or more outlets 148. Thus, when the table 100 is to be stored, the user merely needs to unplug the primary cord to cut power to the work pieces 98 instead of having to unplug each work piece 98. The local power outlet 148 is shown in the Figures as being located on the support column 112, but the power outlet 148 may be located elsewhere on the table 100 (e.g. work platform, base). In aspect, one or more portions of the work platform 120 (e.g. brackets, center portion, outer portion) are at least partially hollow to allow the power cords to be run internally within the table 100 from the work piece 98 to the outlet. This feature prevents tangling of the cords from the work pieces 98 and maintains a clean working space.

While embodiments and applications have been shown and described, it would be apparent to those skilled in the art having the benefit of this disclosure that many more modifications than mentioned above are possible without departing from the inventive concepts disclosed herein. The present disclosure, therefore, is not to be restricted except in the spirit of the appended claims.

What is claimed is:

1. A table for supporting machine tools and work pieces, the table comprising:

a base having a first part with a plurality of casters configured to engage a standing surface; a second part with at least one caster configured to engage the standing surface, the first part and the second part hinged together so that when not in use the second part is configured to be swung up and away from the standing surface for storage and when in use the second part is configured to be swung down so that said at least one caster of the second part engages the standing surface;

a central support column secured to the base;

at least one brace member in engagement with both the second part of the base and the central support column and the at least one brace member configured so that when the at least one brace member is in a first state the at least one caster of the second part of the base is engaged with the standing surface and when the at least one brace member is in a second state the at least one caster of the second part of the base is not engaged with the standing surface; and a work platform hingedly coupled to the central support column so that said work platform is configurable in a first horizontal orientation generally parallel to the standing surface for normal use and in a second non-horizontal orientation not parallel to the standing surface for storage, the work platform configured to have a plurality of work stations at a periphery, each of the plurality of work stations configured to receive a power tool which is securely mounted thereto so that the power tool is secured to the work platform in both the first orientation and the second orientation.

2. The table of claim 1, wherein the periphery of the work platform is generally circular.

3. The table of claim 1, wherein the periphery of the work platform is generally polygonal.

4. The table of claim 1, wherein at least one of the work stations includes a support for a power tool which is recessed below a top surface of the work platform so that a working surface of the power tool is at the same vertical level as the top surface of the work platform.

5. The table of claim 1, wherein the at least one brace member includes a hinge.

6. The table of claim 1, wherein:

at least one of the work stations includes a support for a power tool which is recessed below a top surface of the work platform so that a working surface of the power tool is at the same vertical level as the top surface of the work platform, the at least one brace member includes a hinge; and the base, central column and work platform include structural elements fabricated of steel.

7. The table of claim 1, wherein the central support column is oriented along a vertical axis, the work platform configured to rotate about the vertical axis.

8. The table of claim 1, further comprising a locking mechanism configured to lock the work platform in the first orientation and the second orientation.

9. The table of claim 1, further comprising a locking mechanism configured to lock the work platform in a position between the first orientation and the second orientation.

10. The table of claim 1, wherein one or more of the work stations are removable from the work platform.

11. A table for supporting machine tools and work pieces, the table comprising:

a base configured to be in contact with a standing surface, the base including a first part and a second part hinged together, wherein the second part is rotatably moveable about the hinge between a first operational position and a first stowed position;

a support column secured to the base;

at least one brace member coupled to the second part of the base and the support column, the brace member configured to move between a first state when the second part of the base is in the first operational position a second state with the second part of the base is in the first stowed position; and a work platform hingedly coupled to the support column, the work platform rotatable about the hinge between a second operational position and a second stowed position, wherein the work platform is horizontal and generally parallel to the standing surface when in the second operational position and is non-horizontal and not parallel to the standing surface when in the second stowed position, the work platform having a plurality of work stations, where each of the work stations is configured to securely mount a work piece so that the work piece is secured to the work platform in both the second operational position and the second stowed position.

12. The table of claim 11, wherein a periphery of the work platform is generally circular.

13. The table of claim 11, wherein a periphery of the work platform is generally polygonal.

14. The table of claim 11, wherein at least one of the work stations includes a support for a power tool which is recessed below a top surface of the work platform so that a working surface of the power tool is at the same vertical level as the top surface of the work platform.

15. The table of claim 11, wherein the at least one brace member includes a hinge.

16. The table of claim 11, wherein the base further comprises a plurality of casters extending therefrom and being in contact with the standing surface.

17. The table of claim 11, wherein the central support column is oriented along a vertical axis, the work platform configured to rotate about the vertical axis.

18. The table of claim 11, further comprising a locking mechanism configured to lock the work platform in the second operational position and the second stowed position.

19. The table of claim 11, further comprising a locking mechanism configured to lock the work platform in a position between the second operational position and the second stowed position.

20. The table of claim 11, wherein one or more of the work stations are removable from the work platform.

* * * * *